US010402861B1

(12) United States Patent
Banadaki et al.

(10) Patent No.: US 10,402,861 B1
(45) Date of Patent: Sep. 3, 2019

(54) ONLINE ALLOCATION OF CONTENT ITEMS WITH SMOOTH DELIVERY

(75) Inventors: Seyed Vahab Mirrokni Banadaki, New York, NY (US); Anand Bhalgat, Philadelphia, PA (US); Jon Feldman, New York, NY (US)

(73) Assignee: Google LLC, Mountain View, CA (US)

( * ) Notice: Subject to any disclaimer, the term of this patent is extended or adjusted under 35 U.S.C. 154(b) by 890 days.

(21) Appl. No.: 13/446,901

(22) Filed: Apr. 13, 2012

Related U.S. Application Data

(60) Provisional application No. 61/476,020, filed on Apr. 15, 2011.

(51) Int. Cl.
G06Q 30/00 (2012.01)
G06Q 30/02 (2012.01)

(52) U.S. Cl.
CPC ..... *G06Q 30/0264* (2013.01); *G06Q 30/0251* (2013.01); *G06Q 30/0277* (2013.01)

(58) Field of Classification Search
CPC .......... G06Q 30/0264; G06Q 30/0251; G06Q 30/0277
USPC ................ 705/14.61, 14.49, 14.73
See application file for complete search history.

(56) References Cited

U.S. PATENT DOCUMENTS

| 5,848,397 | A | 12/1998 | Marsh et al. |
|---|---|---|---|
| 7,130,808 | B1 | 10/2006 | Ranka et al. |
| 7,406,434 | B1 | 7/2008 | Chang et al. |
| 7,415,423 | B2 | 8/2008 | Ranka et al. |
| 7,818,207 | B1 | 10/2010 | Veach |
| 7,991,642 | B2 | 8/2011 | Veach |
| 2002/0133398 | A1 | 9/2002 | Geller et al. |
| 2003/0171990 | A1 | 9/2003 | Rao et al. |
| 2004/0078809 | A1 | 4/2004 | Drazin |
| 2005/0021397 | A1 | 1/2005 | Cui et al. |
| 2005/0021403 | A1 | 1/2005 | Ozer et al. |
| 2006/0253327 | A1 | 11/2006 | Morris et al. |

(Continued)

FOREIGN PATENT DOCUMENTS

WO WO-2010021985 A2 * 2/2010 ............. G06Q 30/02

OTHER PUBLICATIONS

Andelman et al., Auctions With Budget Constraints, in $9^{th}$ Scandinavian Workshop on Algorithm Theory (SQAT), pp. 26-38, 2004.

(Continued)

*Primary Examiner* — Michael Bekerman
(74) *Attorney, Agent, or Firm* — Fish & Richardson P.C.

(57) ABSTRACT

This specification describes technologies relating to displaying online content. In general, one aspect of the subject matter described in this specification can be embodied in methods that include determining a timing penalty for a content item, the timing penalty based in part on weights of previous impressions the content item has been allocated during a plurality of intervals within a delivery period. The methods may further include determining a weight associated with a pairing of the content item and an impression, the weight based in part on characteristics of the impression. The methods may further include determining a score for the content item, based in part on the weight and the timing penalty. The methods may further include selecting one of a set of matching content items, based in part on the score for the content item, and allocating the selected content item in response to a request.

27 Claims, 4 Drawing Sheets

(56) References Cited

U.S. PATENT DOCUMENTS

| | | | |
|---|---|---|---|
| 2007/0088605 A1 | 4/2007 | Ghate et al. | |
| 2007/0100801 A1 | 5/2007 | Celik | |
| 2007/0260515 A1* | 11/2007 | Schoen et al. | 705/14 |
| 2008/0281627 A1 | 11/2008 | Chang et al. | |
| 2008/0306810 A1 | 12/2008 | Ranka et al. | |
| 2009/0193458 A1 | 7/2009 | Finseth et al. | |
| 2009/0327029 A1 | 12/2009 | Collins | |
| 2010/0023375 A1* | 1/2010 | Tomlin et al. | 705/10 |
| 2010/0023392 A1 | 1/2010 | Merriman et al. | |
| 2010/0049584 A1* | 2/2010 | Mehta et al. | 705/10 |
| 2010/0100407 A1* | 4/2010 | Lin et al. | 705/8 |
| 2010/0161408 A1 | 6/2010 | Karson et al. | |
| 2010/0262601 A1* | 10/2010 | Dumon et al. | 707/727 |
| 2010/0293046 A1 | 11/2010 | Cooke et al. | |
| 2010/0293218 A1 | 11/2010 | Zhang et al. | |
| 2010/0299209 A1 | 11/2010 | Mehta et al. | |
| 2010/0299215 A1 | 11/2010 | Feldman et al. | |
| 2010/0332322 A1 | 12/2010 | Porte | |
| 2011/0078014 A1* | 3/2011 | Feldman et al. | 705/14.42 |
| 2011/0258049 A1* | 10/2011 | Ramer et al. | 705/14.66 |
| 2011/0270674 A1 | 11/2011 | Cosman | |
| 2012/0253926 A1* | 10/2012 | Chen et al. | 705/14.49 |

OTHER PUBLICATIONS

S. Agrawal, Z. Wang, and Y. Ye. A dynamic near-optimal algorithm for online linear programming. Working paper posted at http://www.stanford.edu/ yyye/. 2009.

S. Alaei and A. Malekian. Maximizing sequence-submodular functions, manuscript. 2010.

A. Asadpour and A. Saberi. An approximation algorithm for max-min fair allocation of indivisible goods. In *STOC*, pp. 114-121, 2007.

B. Awerbuch, Y. Azar, and S. Plotkin. Throughput-competitive on-line routing. In *FOCS*, vol. 34, pp. 32-40, 1993.

Y. Azar, B. Birnbaum, A. Karlin, C. Mathieu, and C. Nguyen. Improved Approximation Algorithms for Budgeted Allocations. In *ICALP*, pp. 186-197, Springer-Verlag Berlin, Heidelberg, 2008.

Azar et al., Balanced Allocations, SIAM J. Comput., 29(1):180-200, 1999.

M. Babaioff, N. Immorlica, D. Kempe, and R. Kleinberg. Online auctions and generalized secretary problems. *SIGecom Exchanges*, 7(2), 2008.

Bhalgat et al. "Online Allocation of Display Ads with Smooth Delivery", University of Pennsylvania; Google, Inc., New York; In KDD, 2012. Preliminary version appeared in AdAuction Workshop 2011; 10 pages.

N. Bansal and M. Sviridenko. The santa claus problem. In *STOC*, pp. 31-40, 2006.

M. Bateni, M. Charikar, and V. Guruswami. Maxmin allocation via degree lower-bounded arborescences. In *STOC*, 2009.

Bertsekas P. and Castanon D. A.. Rollout Algorithms for Stochastic Scheduling Problems. *J of Heuristics*, 5(1):89-108, 1999.

A. Z. Broder, P. Ciccolo, E. Gabrilovich, V. Josifovski, D. Metzler, L. Riedel, and J. Yuan. Online expansion of rare queries for sponsored search. In *WWW*, pp. 511-520, 2009.

A. Z. Broder, M. Fontoura, V. Josifovski, and L. Riedel. A semantic approach to contextual advertising. In *SIGIR*, pp. 559-566, 2007.

N. Buchbinder, K. Jain, and J. Naor. Online Primal-Dual Algorithms for Maximizing Ad-Auctions Revenue. In *Proc. ESA*, p. 253. 2007.

N. Buchbinder and J. Naor. Improved bounds for online routing and packing via a primal-dual approach. In *FOCS*, pp. 293-304, 2006.

D. Chakrabarty, J. Chuzhoy, and S. Khanna. On allocating goods to maximize fairness. In *FOCS*, 2009.

D. Chakrabarty and G. Goel. On the approximability of budgeted allocations and improved lower bounds for submodular welfare maximization and GAP. In *Proc. FOCS*, pp. 687-696, 2008.

S. Chawla, J. D. Hartline, D. Malec, and B. Sivan. Multi-parameter mechanism design and sequential posted pricing. *STOC*, 2010.

F. Chierichetti, R. Kumar, and S. Vassilvitskii. Similarity caching. In *PODS*, pp. 127-136, 2009.

N. Devanur and T. Hayes. The adwords problem: Online keyword matching with budgeted bidders under random permutations. In *ACM EC*, 2009.

Pucci de Farias, D. and Van Roy, B. On Constraint Sampling in the Linear Programming Approach to Approximate Dynamic Programming. *Math. Oper. Res.*, 29(3):462-478, 2004.

J. Feldman, N. Korula, V. Mirrokni, S. Muthukrishnan, and M. Pal. Online ad assignment with free disposal. In *WINE*, 2009.

Farias V.F. and Van Roy, B. Approximation algorithms for dynamic resource allocation. *Oper. Res. Lett.*, 34(2):180-190, 2006.

Jon Feldman, Monika Henzinger, Nitish Korula, Vahab S. Mirrokni, Cliff Stein. Online Stochastic Ad Allocation: Efficiency and Fairness, Jan. 27, 2010.

J. Feldman, A. Mehta, V. Mirrokni, and S. Muthukrishnan. Online stochastic matching: Beating 1-1/e. In *FOCS*, 2009.

Jon Feldman, Monika Henzinger, Nitish Korula, Vahab S. Mirrokni, Cliff Stein. Online Stochastic Packing applied to Display Ad Allocation, Feb. 17, 2010.

Garg N. et al. Stochastic Analyses for Online Combinatorial Optimization Problems. In *SODA*, pp. 942-951, 2008.

A. Ghosh, P. McAfee, K. Papineni, and S. Vassilvitskii. Bidding for representative allocations for display advertising. In *WINE*, pp. 208-219, 2009.

A. Ghosh, B. I. P. Rubinstein, S. Vassilvitskii, and M. Zinkevich. Adaptive bidding for display advertising. In *WWW*, pp. 251-260, 2009.

A. Goel, A. Meyerson, and S. A. Plotkin. Combining fairness with throughput: online routing with multiple objectives. In STOC, pp. 670-679, 2000.

G. Goel and A. Mehta. Adwords auctions with decreasing valuation bids. In *WINE*, pp. 335-340, 2007.

G. Goel and A. Mehta. Online budgeted matching in random input models with applications to adwords. In *SODA*, pp. 982-991, 2008.

Grandoni F. et al. Set Covering with Our Eyes Closed. 2008 9th Annual Symposium on Foundations of Computer Science (*FOCS*), pp. 347-356, 2008.

R. Karp, U. Vazirani, and V. Vazirani. An optimal algorithm for online bipartite matching. In *Proc. STOC*, 1990.

J. M. Kleinberg, Y. Rabani, and E. Tardos. Fairness in routing and load balancing. *J. Comput. Syst. Sci.*, 63(1):2-20, 2001.

R. Kleinberg. A multiple-choice secretary algorithm with applications to online auctions. In *Proceedings of the sixteenth annual ACM-SIAM symposium on Discrete algorithms*, pp. 630-631. Society for Industrial and Applied Mathematics, 2005.

N. Korula and M. Pal. Algorithms for secretary problems on graphs and hypergraphs. In *ICALP*, 2009.

A. Kumar and J. M. Kleinberg. Fairness measures for resource allocation. *SIAM J. Comput.*, 36(3):657-680, 2006.

R. Lipton, E. Markakis, E. Mossel, and A. Saberi. On approximately fair allocations of indivisible goods. In *ACM EC*, 2004.

M. Mandian, H. Nazerzadeh, and A. Saberi. Allocating online advertisement space with unreliable estimates. In *ACM EC*, pp. 288-294, 2007.

A. Mehta, A. Saberi, U. Vazirani, and V. Vazirani. Adwords and generalized online matching. In *FOCS*, 2005.

Mitzenmacher M. The power of Two Choices in Randomized Load Balancing. *IEEE Trans. Parallel Distrib. Syst.*, 12(10):1094-1104, 2001.

S. Pandey, A. Z. Broder, F. Chierichetti, V. Josifovski, R. Kumar, and S. Vassilvitskii. Nearest-neighbor caching for content-match applications. In *WWW*, pp. 441-450, 2009.

PricewaterhouseCoopers and the Interactive Advertising Bureau. IAB Internet advertising revenue report, 2009. http://www.docstoc.com/docs/5134258/IAB-2008-Report.

A. Srinivasan. Budgeted Allocations in the Full-Information Setting. In *APPROX*, 2008.

Erik Vee, Sergei Vassilvitskii, Jayavel Shanmugasundaram. Optimal Online Assignment with Forecasts, Electronic Commerce 2010, Jun. 7-11, 2010.

A. Vetta. Nash equilibria in competitive societies, with applications to facility location, traffic routing and auctions. In *FOCS*, 2002.

(56) References Cited

OTHER PUBLICATIONS

Wang and Xia. "Analysis and Design of Primal-Dual Assignment Networks." IEEE Transactions on Neural Networks, 9(1): pp. 183-194, Jan. 1998.
Official Journal of the European Patent Office. vol. 30, No. 11, Nov. 1, 2007 (Nov. 1, 2007) pp. 592-593, XP007905525, ISSN: 0170-9291.
Notification of Transmittal of International Search Report and Written Opinion dated May 24, 2012 for PCT/US2012/028356, 13 pages.
International Preliminary Report on Patentability in International Application No. PCT/US2012/028356, dated Oct. 1, 2013, 8 pages.

\* cited by examiner

ONLINE ALLOCATION OF CONTENT ITEMS WITH SMOOTH DELIVERY

CROSS-REFERENCE TO RELATED APPLICATION

This patent application claims priority to U.S. Provisional Application No. 61/476,020, which was filed on Apr. 15, 2011. U.S. Provisional Application No. 61/476,020 is hereby incorporated by reference into this patent application as if set forth herein in full.

BACKGROUND

The present disclosure relates to the selection and display of online content.

The Internet provides access to a wide variety of resources. For example, video and/or audio files, as well as web pages for particular subjects or particular news articles, are accessible over the Internet. Access to these resources presents opportunities for content (e.g., advertisements) to be provided with the resources. The pairing of content with requested resources can generate value. For example, a web page can include content slots in which advertisements or other content can be presented. These content slots can be defined in the web page or defined for presentation with a web page, for example, in a pop-up window.

Content slots can be allocated to buyers based on agreements entered into by publishers of online resources and buyers, where the agreement requires that publisher allocate to the buyer at least a threshold number of content slots over a specified period. For example, a publisher can agree, for a fee, to allocate at least 1000 of its available content slots to a buyer that has paid the publisher $10. In turn, the publisher's content slots can be allocated to the buyer over the specified period until 1000 content slots have been allocated to the buyer. A publisher may enter multiple agreements committing content slots to different buyers. Buyers may have many different content items that they wish to pair with resources.

SUMMARY

This specification, including the attached Appendix A, which is incorporated by reference in its entirety here, and which was incorporated in U.S. Provisional Application No. 61/476,020, filed Apr. 15, 2011, describes technologies relating to selection and delivery of online content items. In general, one aspect of the subject matter described in this specification can be embodied in a method that includes receiving a request for content including an impression. The method may further include identifying a set of matching content items that are eligible to be served in the impression. For each of the matching content items, the method may further include determining a weight associated with a pairing of the content item and the impression, the weight based in part on characteristics of the impression. The method may further include determining a timing penalty for the content item, the timing penalty based in part on weights of previous impressions the content item has been allocated during a plurality of intervals within a delivery period. The method may further include determining a score for each content item, the score based in part on the weight and the timing penalty. The method may further include selecting one of the matching content items, based in part on the score for the content item. The method may further include allocating the selected content item in response to the request. The timing penalty may be determined in part by determining an average of the weights of previous impressions. The timing penalty may be determined in part by determining a minimum of the weights of previous impressions. The timing penalty may be determined in part by determining an exponentially weighted sum of the weights of previous impressions.

In general, one aspect of the subject matter described in this specification can be embodied in a system that includes a data processing apparatus and a memory coupled to the data processing apparatus. The memory having instructions stored thereon which, when executed by the data processing apparatus cause the data processing apparatus to perform operations including receiving a request for content including an impression. The operations may further include identifying a set of matching content items that are eligible to be served in the impression. For each of the matching content items, the operations may further include determining a weight associated with a pairing of the content item and the impression, the weight based in part on characteristics of the impression. The operations may further include determining a timing penalty for the content item, the timing penalty based in part on weights of previous impressions the content item has been allocated during a plurality of intervals within a delivery period. The operations may further include determining a score for the content item, the score based in part on the weight and the timing penalty. The operations may further include selecting one of the matching content items, based in part on the score for the content item. The operations may further include allocating the selected content item in response to the request.

In general, one aspect of the subject matter described in this specification can be embodied in a system that includes a server system interface configured to receive a request for content including an impression. The system may further include a module configured to identify a set of matching content items that are eligible to be served in the impression. The system may further include a module configured to determine a weight associated with a pairing of a matching content item and the impression, the weight based in part on characteristics of the impression. The system may further include means for determining a timing penalty for the matching content item, the timing penalty based in part on weights of previous impressions the matching content item has been allocated during a plurality of intervals within a delivery period. The system may further include means for determining a score for the matching content item, the score based in part on the weight and the timing penalty. The system may further include a module configured to select one of the matching content items, based in part on the score for the matching content item. The system may further include a server system interface configured to allocate the selected content item in response to the request.

In general, one aspect of the subject matter described in this specification can be embodied in a computer readable media storing software including instructions executable by a processing device that upon such execution cause the processing device to perform operations that include receiving a request for content including an impression. The operations may further include identifying a set of matching content items that are eligible to be served in the impression. For each of the matching content items, the operations may further include determining a weight associated with a pairing of the content item and the impression, the weight based in part on characteristics of the impression. The operations may further include determining a timing penalty for the content item, the timing penalty based in part on weights of previous impressions the content item has been allocated during a plurality of intervals within a delivery period. The operations may further include determining a score for the content item, the score based in part on the weight and the timing penalty. The operations may further include selecting one of the matching content items, based in part on the score for the content item. The operations may further include allocating the selected content item in response to the request.

These and other embodiments can each optionally include one or more of the following features. The timing penalty may be determined in part by determining an average of the weights of previous impressions. The timing penalty may be determined in part by determining a minimum of the weights of previous impressions. The timing penalty may be determined in part by determining an exponentially weighted sum of the weights of previous impressions. The timing penalty may depend on a subset of the previous impressions. Determining the timing penalty may include merging a subset of the previous impressions associated with a previous interval into the subset of previous impressions associated with the current interval. One of the characteristics of the impression on which the weights are based may be a characteristic of a user who requested the impression. One of the characteristics of the impression on which the weights are based may be a time associated with the request. The weight for one of the matching content items may be a predicted click through rate for that content item in the impression. The score for one of the matching content items may be determined in part by subtracting the timing penalty for the current interval from the weight. The plurality of intervals may each have a maximum number of impressions requested. The plurality of intervals may each have a budget for impressions.

Particular embodiments of the invention can be implemented to realize none, one or more of the following advantages. Some implementations may provide for smooth allocation of content items over a period of time to fulfill one or more allocation commitments while achieving a high average value for the allocations within the period. Some implementations allow a publisher to balance the need to meet allocation commitments with the desire to maximize average allocation value. Some implementations may be proven to achieve certain performance levels under certain conditions.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
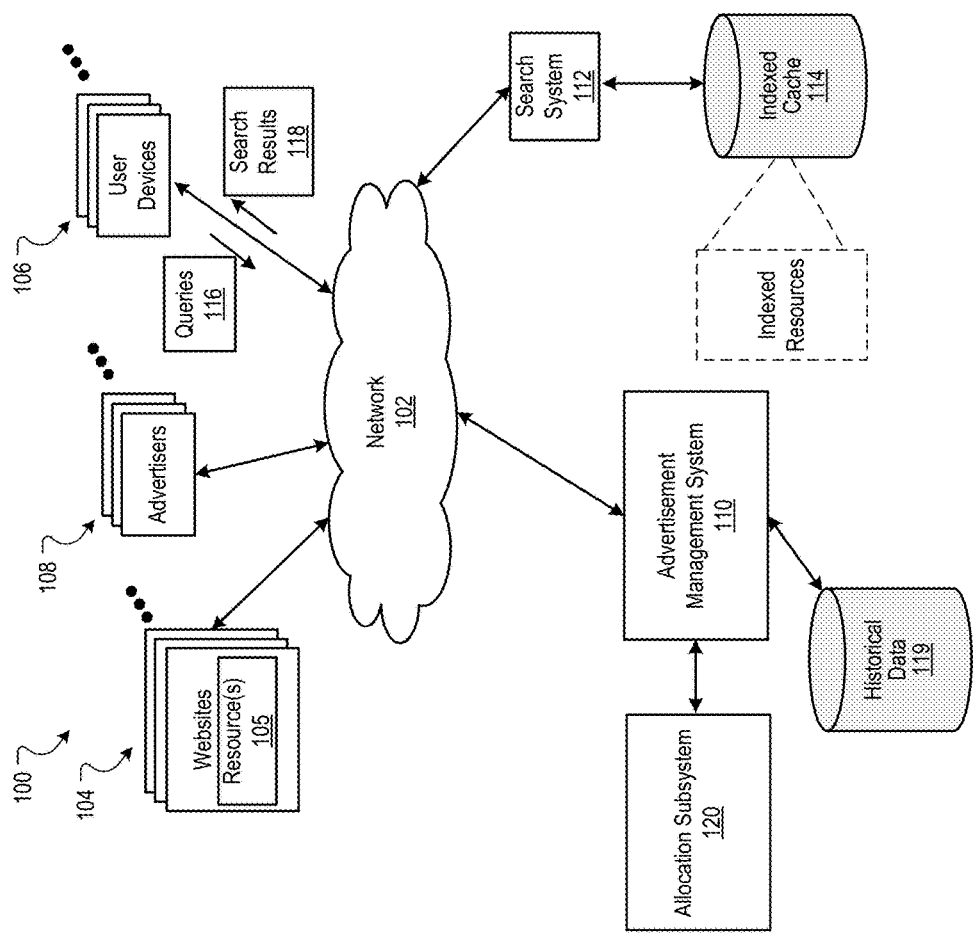
FIG. 1 is a block diagram of an example online environment.

An online content delivery service provides content items (e.g. advertisements) for presentation to a user by selecting content items from a pool of candidates based on a score assigned to each candidate content item. For example one type of score that may be used is a quality score. In some implementations, a quality score can be a metric that quantifies the relevance of a candidate content item to other content in the online resource that the user is viewing. Because a relevant content item is likely to be interacted with by a user, a higher score indicates a higher likelihood that the candidate content item will be interacted with if displayed on a web page (e.g., a web page displaying search results). The quality score may be based on other factors, such as the relevance and quality of a web page that the candidate content item links to.

Selection of a content item for presentation in response to a resource request is interchangeably referred to as allocation of an impression to the selected content item (e.g. an advertisement).

The value of a particular resource request to a resource provider may correspond to the value to the resource provider of the presentation of one or more content items to a user in response to the resource request. For example, a request for an online resource may correspond to opportunities for providing one or more content items to a user that initiated the request. An opportunity to pair a content item with other content in the requested resource and provide the content item to a user for presentation in response to the request may be referred to as a content slot or an impression. Thus, each resource request represents one or more impressions that may each be allocated to a content item (e.g. an advertisement) that is selected to be provided in response to the resource request. The value of allocating an impression to a particular content item may depend on how a user is likely to react to presentation of the content item in the context of the impression.

The value of an allocation may be estimated based on information about the impression and the content item. For example, relevant information about an impression may include information about other content in the requested resource (e.g. keywords), the time of the request, data about the user who made the request (e.g. cookies, geographic location, etc.), etc. A content or advertisement allocation system may seek to allocate impressions to content items in a manner that maximizes the estimated value of the allocations. In some implementations, a score used for selection of content items may be based in part on an estimate of the value of allocating an impression to a content item.

When selecting online content items for display, the online content selection service could reject candidates that have scores that fall below a certain threshold because those candidates are not sufficiently valuable or relevant to other content in a requested resource or are low quality and not likely to be interacted with by a user. If the candidates are chosen independently of each other, it is possible that most or all of the chosen candidates may have a score only slightly above the threshold. In some implementations, the candidates are also evaluated with respect to the other candidate content items, such that the user can be presented with content items that together satisfy a predetermined measure of delivery quality or value.

In some implementations, an online content selection service seeks to allocate a minimum number of impressions to a content item in order to satisfy a delivery goal for the content item during a certain period of time. Because the value of an impression when paired with a content item with a delivery goal may be less than alternative content items that could be allocated the impression, there may be a tradeoff between meeting delivery goals for particular content items and maximizing cumulative value of impression inventory.

In some implementations, the allocation of impressions to particular content items or groups of content items may be smoothed over time by partitioning a delivery period into a plurality of intervals. Nested packing constraints may be determined for each of the intervals. An online content selection service may attempt to optimize the allocation of impressions to content items over the delivery period subject to these packing constraints by implementing the algorithms disclosed in Appendix A.

A content item is any data that can be provided over a network. The processes described below are illustratively applied to content items that are advertisements provided in response to a request from an online resource, but the processes are also applicable to other content items provided over a network. Additionally, the description that follows describes the advertisements being selected by an allocation subsystem that is implemented as an element of an advertisement management system. However, the allocation subsystem can be implemented as an independent system that communicates directly, or over a network, with the advertisement management system or another data processing apparatus.

FIG. 1 is a block diagram of an example online environment 100 in which a content management system (e.g. advertisement management system 110) manages content delivery services. The example environment 100 includes a network 102 such as a local area network (LAN), wide area network (WAN), the Internet, or a combination thereof. The network 102 connects websites 104, user devices 106, content providers (e.g., advertisers 108), and the advertisement management system 110. The example environment 100 may include many thousands of websites 104, user devices 106, and advertisers 108.

A website 104 includes one or more resources 105 associated with a domain name and hosted by one or more servers. An example website is a collection of webpages formatted in hypertext markup language (HTML) that can contain text, images, multimedia content, and programming elements, e.g., scripts. Each website 104 is maintained by a publisher, e.g., an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few examples. The resources can include content, e.g., words, phrases, images and sounds that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102 and the presentation of content to a user.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements or other content can be presented. These specified portions of the resource or user display are referred to as advertisement slots or impressions.

To facilitate searching of these resources, the environment can include a search system 112 that identifies the resources by crawling and indexing the resources provided by the publishers on the websites 104. Data about the resources can be indexed based on the resource to which the data corresponds. The indexed and, optionally, cached copies of the resources are stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements or other content items can be presented.

When a resource 105 or search results 118 are requested by a user device 106, the advertisement management system 110 receives a request for additional content (e.g., advertisements) to be provided with the resource 105 or search results 118. The request for advertisements can include characteristics of the advertisement slots that are defined for the requested resource or search results page, and these requests are provided to the advertisement management system 110.

For example, a reference (e.g., URL) to the resource for which the advertisement slot is defined, a size of the advertisement slot, and/or media types that are available for presentation in the advertisement slot can be provided to the advertisement management system 110. Similarly, keywords associated with a requested resource ("resource keywords") or a search query 116 for which search results are requested can also be provided to the advertisement management system 110 to facilitate identification of advertisements that are relevant to the resource or search query 116.

Based on data included in the request for advertisements, the advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries 116. In some implementations, advertisements having targeting keywords that match the resource keywords or the search query 116 are selected as eligible advertisements by the advertisement management system 110.

A targeting keyword can match a resource keyword or a search query 116 by having the same textual content ("text") as the resource keyword or search query 116. For example, an advertisement associated with the targeting keyword "basketball" can be an eligible advertisement for an advertisement request including the resource keyword "basketball." Similarly, the advertisement can be selected as an eligible advertisement for an advertisement request including the search query "basketball."

A targeting keyword can also match a resource keyword or a search query 116 by having text that is identified as being relevant to a targeting keyword or search query 116 despite having different text than the targeting keyword. For example, an advertisement having the targeting keyword "basketball" may also be selected as an eligible advertisement for an advertisement request including a resource keyword or search query for "sports" because basketball is a type of sport, and therefore, is relevant to the term "basketball."

The advertisement management system 110 can select from the eligible advertisements that are provided for presentation in advertisement slots of a resource or search results page based on results of an auction. For example, the advertisement management system 110 can receive bids from advertisers and allocate the advertisement slots to the highest bidders at the conclusion of the auction. The bids are amounts that the advertisers are willing to pay for presentation (or selection) of their advertisement with a resource or search results page. For example, a bid can specify an amount that an advertiser is willing to pay for each 1000 impressions (i.e., presentations) of the advertisement, referred to as a CPM bid. Alternatively, the bid can specify an amount that the advertiser is willing to pay for a selection (i.e., a click-through) of the advertisement or a conversion following selection of the advertisement. The highest bidders can be determined based on the bids alone, or based on the bids of each bidder being multiplied by one or more factors, such as quality scores derived from advertisement performance, landing page scores, and the like.

A conversion occurs when a user performs a particular action related to an advertisement provided with a resource or search results page. What constitutes a conversion may vary from case to case and can be determined in a variety of ways. For example, a conversion may occur when a user clicks on an advertisement, is referred to a web page, and consummates a purchase there before leaving that web page. A conversion can also be defined by an advertiser to be any measurable/observable user action such as, for example, downloading a white paper, navigating to at least a given depth of a website, viewing at least a certain number of web pages, spending at least a predetermined amount of time on a website or web page, registering on a website, etc. Other actions that constitute a conversion can also be used.

The number of impressions that a particular advertiser receives may vary based, in part, on actions of other advertisers. For example, other advertisers in the auction may increase their bids to values higher than that of the particular advertiser. In turn, advertisements provided by the other advertisers may be presented in the advertisements slots that are allocated through the auction. Thus, the number of impressions that the particular advertiser's advertisement(s) receives may be below a number of impressions that the particular advertiser desired. The particular advertiser may have to increase its bid, and potentially pay more money than originally budgeted, to receive the desired number of impressions.

Some advertisers prefer that the number of impressions allocated to their advertisement and the price paid for the number of impressions be more predictable than the predictability provided by an auction. An advertiser can increase the likelihood that its advertisement receives a desired or specified number of impressions, for example, by entering into an agreement with a publisher, where the agreement requires the publisher to provide at least a threshold number of impressions (e.g., 1,000 impressions) for the advertisement over a specified period (e.g., one week). In turn, the advertiser, publisher, or both parties can provide data to the advertisement management system 110 that enables the advertisement management system 110 to facilitate satisfaction of the agreement.

For example, the advertiser can upload an advertisement and authorize the advertisement management system 110 to provide the advertisement in response to advertisement requests corresponding to the publisher's website. Similarly, the publisher can provide the advertisement management system 110 with data representing the specified time period as well as the threshold number of impressions that the publisher has agreed to allocate to the advertisement over the specified time period.

To facilitate allocation of advertisements according to the terms of an agreement between two parties, the advertisement management system 110 may include an allocation subsystem 120. The allocation subsystem 120 selects eligible advertisements for presentation with a publisher's website in accordance with the agreement. The allocation subsystem 120 may determine, for example, an expected number of impressions that are available from the publisher's website over the specified time period and allocates impressions to the advertisement(s) such that the threshold number of impressions is allocated to the advertisement(s) by the end of the specified period.

Although the number of impressions that the publisher's website will receive over the specified time period is not known with absolute certainty in advance, the allocation subsystem 120 can compute the expected number of impressions for the website over the specified time period based on, for example, historical user impression data that is stored, for example, in a historical data store 119. The historical data store 119 is a data store that stores data representing previous user interactions with publisher websites and advertisements. For example, in response to receiving a request for an advertisement, the advertisement management system 110 can store data identifying the website to which the request corresponds and identifying the request as an impression for the website. Additionally, the advertisement management system 110 can store data representing the advertisements that were provided in response to the request and any user actions (e.g., click-throughs or conversions) that are detected following presentation of the advertisements. Alternatively the publisher can provide these estimates to the advertisement management system 110 for storage in the historical data store 119.

The allocation subsystem 120 may receive the user impression data for a website from the historical data store 119 and compute the expected number of impressions based, for example, on a statistical analysis of a total number of impressions for the website over time periods that are similar to the specified time period over which the impressions are to be allocated to the advertisement. The allocation subsystem 120 can also use trending information to adjust the expected number of impressions based on identified trends in user impressions for the website. The expected number of impressions for the website can be provided to the publisher so that the publisher can use the expected number of impressions as a basis for entering agreements with advertisers to provide advertisement impressions. Additionally, the allocation subsystem 120 can use the expected number of user impressions, as described above, to allocate user impressions over the specified period so that the threshold number of impressions are provided to the advertiser over the specified period.

In addition to satisfying the terms of an agreement by providing the advertiser with at least the threshold number of impressions, advertisers and publishers generally prefer impressions to be allocated to advertisements in a manner that provides a higher cumulative value relative to other possible allocations. For example, when the cumulative value to an advertiser increases without an increase in price, the advertiser achieves a higher return on investment. The publisher also prefers that the impressions be allocated to increase the cumulative value to the advertisers because doing so increases advertiser satisfaction with the agreement and makes it more likely that advertisers will continue to enter agreements with the publisher. In some cases an agreement may provide further incentives to a publisher to maximize cumulative value of the allocations by providing for increased revenue based on higher levels of conversion.

The allocation subsystem 120 may be configured to allocate impressions to advertisers so that allocation of the impressions increases the cumulative value provided to the advertisers. In some implementations, the allocation subsystem 120 determines, for each of the advertisers, a value of an impression corresponding to an advertisement request based on the characteristics of the impression, and determines the effect that the impression would have on the cumulative value to each advertiser if the impression were allocated to the advertiser. In turn, the allocation subsystem 120 can, in some implementations, allocate the impression to the advertiser whose cumulative value increases the most as a result of the impression being allocated to the advertiser, as described below. In some implementations, the impression can be allocated to an advertiser whose cumulative value increases, but may not increase the most.

The allocation subsystem 120 may smooth the allocations to an advertisement over a delivery period by breaking the delivery period up into intervals and enforcing soft timing constraints on allocations to the advertisement in each interval. The impression allocation constraints for each interval may be determined by the allocation subsystem from the delivery goal for the period. For example, a day long delivery period may be partitioned 24 prefix intervals, each an hour longer than the last. The target number of allocations for the nth interval may be set to n/24 times the delivery goal for the entire delivery period. In some implementations, the intervals and delivery goals or budgets for each interval are specified by an advertiser. The allocation subsystem may determine timing penalties for each interval that increase as the delivery goals for an interval are approached. In some implementations, the timing constraints may be enforced by adjusting quality scores used to select advertisements for allocation based on the timing penalties.

Figure 4:
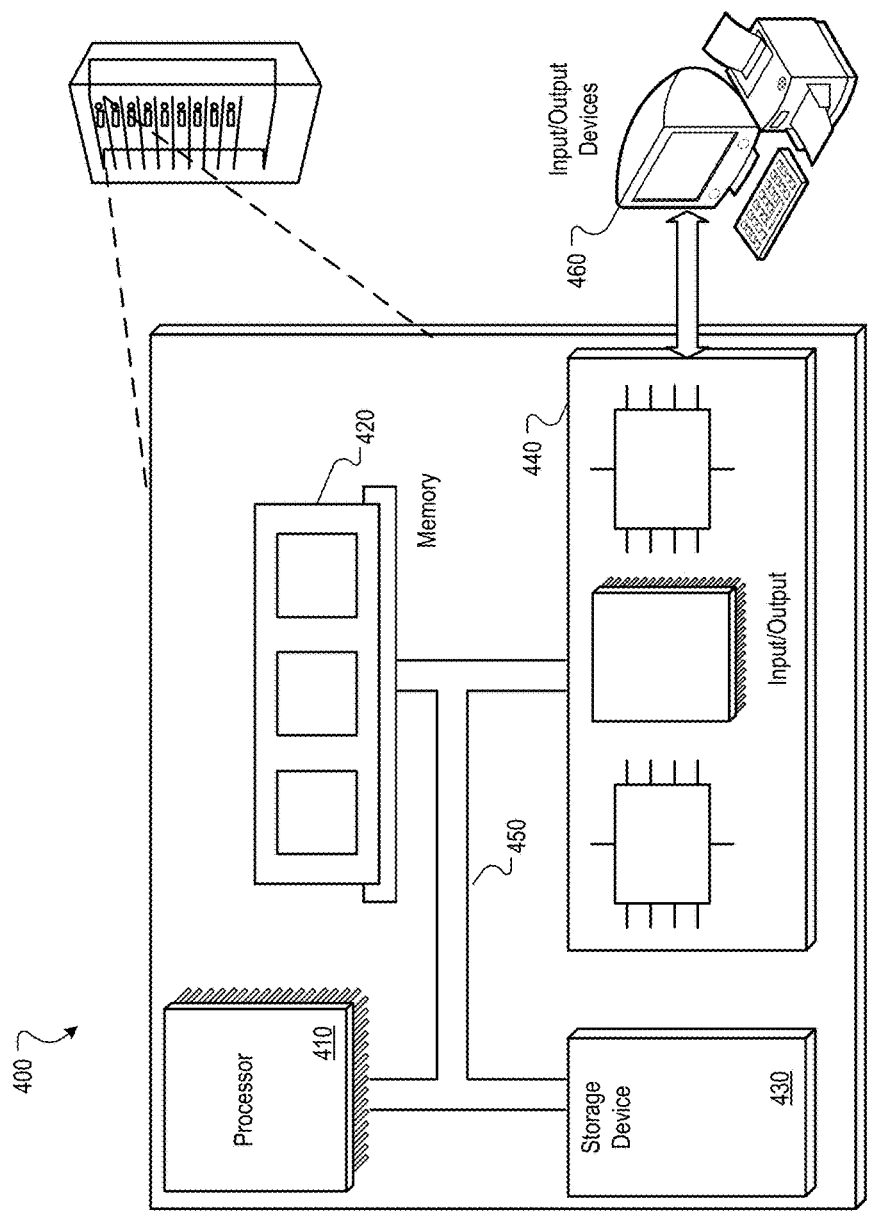
FIG. 4 is a block diagram of an example computer system that can be used to facilitate the display of content items.

The allocation subsystem 120 may be implemented as software that is executed on a processing apparatus, such as the computer system described in FIG. 4.

Figure 2:
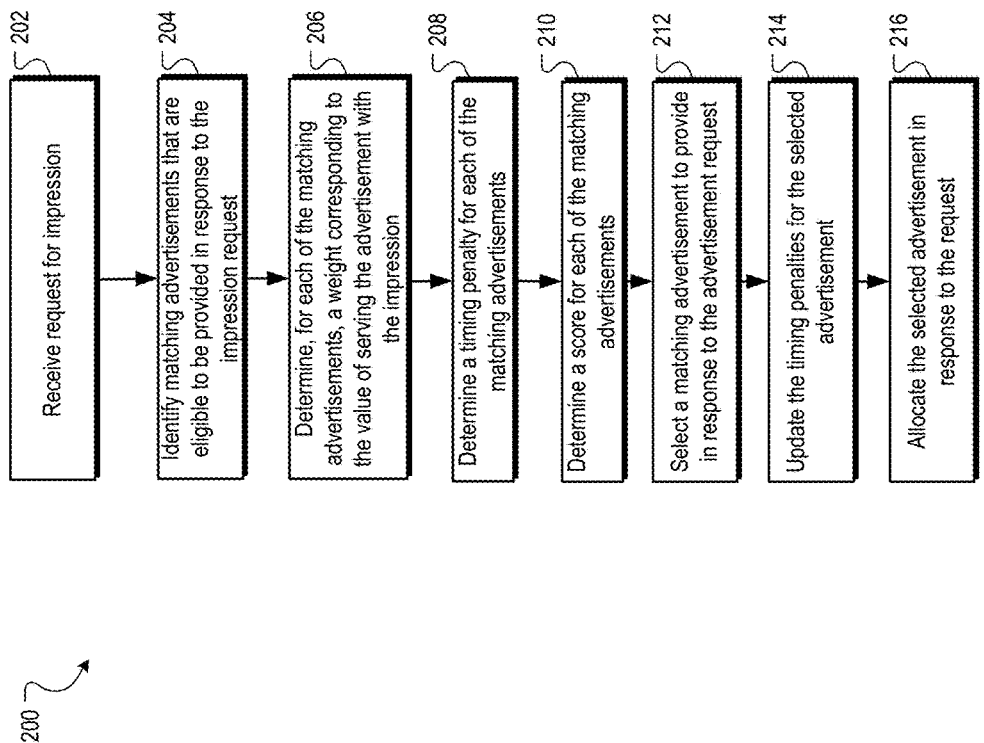
FIG. 2 is a flow chart of an example process for providing a content item in response to a request.

FIG. 2 is a flow chart of an example process 200 of providing an advertisement or other content item in response to a request. An advertisement request is received and eligible advertisements that are eligible to be provided in response to the request are identified. For each of the eligible advertisements, an impression weight corresponding to the advertisement request, a timing penalty, and an allocation score are obtained. The timing penalties may be determined in part based on the weights of past impressions that were allocated to an advertisement earlier in the delivery period. Using the impression weights and the timing penalties, an allocation score is computed for each of the advertisements. Based on the allocation scores, an eligible advertisement is selected and provided in response to the advertisement request.

The process 200 can be implemented, for example, by the allocation subsystem 120 and/or the advertisement management system 110 of FIG. 1 having access to the impression data. In some implementations, the allocation subsystem 120 is a data processing apparatus that includes one or more processors that are configured to perform actions of the process 200. For example, the data processing apparatus may be the apparatus described in FIG. 4. In other implementations, a computer readable medium can include instructions that when executed by a computing device (e.g., a computer system) cause the device to perform actions of the process 200.

A request for an impression is received 202. In some implementations, the request is a request for an advertisement to be provided with a publisher's resource. For example, the request can be a request for an advertisement or other content item to be provided in a particular content slot that is defined in the publisher's webpage or a content slot that is defined to be presented with search results.

The request may include data identifying a resource (e.g., web page) that has an available impression, for which the request is being submitted. The request can further include data identifying characteristics of the content slot (e.g., dimensions and acceptable file formats) in which a selected content item (e.g. an advertisement) can be presented as well as other characteristics of the impression corresponding to the request. For example, the request can include physical characteristics of the content slot (e.g., size, shape, and location), characteristics of a user that will be presented the impression (e.g., demographic and psychographic information), as well as characteristics of the content that will be presented with the advertisement or other content item (e.g., resource keywords that represent topics to which the content is relevant).

For example, the request may be received 202 through a server system interface of the allocation subsystem 120 or the advertising management system 110.

In response to the request for the impression, matching advertisements that are eligible to be provided in response to the request are identified 204. In some implementations, the matching advertisements are advertisements for which the publisher of the resource for which the request is being submitted has agreed to allocate impressions. As described above with reference to FIG. 1, a publisher can agree to allocate at least a threshold number of impressions to one or more advertisers' advertisements. In turn, the details of the agreement can be provided to an advertisement management system 110 that manages allocation of impressions to advertisements. Thus, when a request identifies the publisher's site, the advertisements to which the publisher has agreed to allocate impressions can be identified as the matching or eligible advertisements.

In some implementations, the eligible advertisements for a particular request are a subset of the advertisements to which the publisher has agreed to allocate impressions. For example, if a publisher has agreed to allocate to example advertisement A impressions only on pages that include sports content, advertisement A will not be an eligible advertisement for an advertisement request corresponding to a political page provided by the publisher that does not include sports content. Similarly, an advertiser can specify targeting criteria (e.g., targeting keywords and user age) that should be matched for the advertisement to be an eligible advertisement. In this situation, the advertiser's advertisement is an eligible advertisement only for those requests corresponding to impressions that match the targeting criteria.

In some implementations, the eligible advertisements can include advertisements for which the publisher has already allocated the number of impressions that the publisher agreed to provide. For example, assuming that a publisher has agreed to allocate 100 impressions to advertisement X and 500 impressions to advertisement Y, and 100 impressions have already been allocated to each advertisement; both of the advertisements can remain eligible advertisements for advertisement requests corresponding to the publisher's pages. Allowing an advertisement (e.g., advertisement X) to continue to be an eligible advertisement even after an agreed upon number of impressions (e.g., 100 impressions) have been allocated to the advertisement enables the value of the agreed upon number of impressions (e.g., a top 100 impression values) to be increased beyond the value of an initially allocated agreed upon number of impressions (e.g., the initial 100 impressions that are allocated to advertisement X).

For each of the matching advertisements, a weight is determined 206. The weight may correspond to expected value for the advertiser of serving the advertisement in the requested impression. For example the weight may be an impression score. Impression scores for the advertisement request can be received, for example, from a data store storing impression scores indexed by advertisement (or advertiser) and impression characteristics specified by the advertisement request, computed based on a functions provided by the advertisers, or computed based on predicted performance measures of the eligible advertisements if the eligible advertisements were to be provided in response to the request. In some implementations, the weight is a predicted click through rate for the advertisement in the requested impression.

In some implementations, the impression score for each advertisement can be computed based on an estimated click-through rate or conversion rate for the advertisement if the advertisement were provided in response to the request. For example, using historical advertisement selection data and/or conversion data, a baseline advertisement performance (e.g., average, median, or other statistical measure of performance) for advertisements presented in response to previous instances of the impression or similar impressions can be computed. This baseline advertisement performance can then be adjusted based on how well the advertisement's targeting criteria is matched by the impression characteristics and/or previous performance data for the advertisement when provided in response to requests for impressions having similar characteristics. In turn, the estimated performance for the advertisement can be assigned as the impression score or converted/normalized to an impression score that represents the value of the impression paired with the matching advertisement, for example, on a normalized scale (e.g., on a scale from 1-10).

In some implementations, the impression score for each advertisement may be computed using a machine learning system to estimate impression scores based on data reflecting previous impressions.

In some implementations, the weight may be computed based on values that are received for each advertisement. Data may be received from advertisers specifying various values corresponding to different impressions having differing characteristics. For example, an advertiser may specify that the advertiser receives $1.00 of value from each presentation of an advertisement to users between the ages of 18-25, while only deriving $0.50 of value from each presentation of the advertisement to users that are 26-30. Values can similarly be received from other advertisers and for other impression characteristics. The values received from the advertisers can be stored in a data store (e.g. data store 119) and retrieved, for example, based on impression characteristics specified by a request.

A timing penalty may be determined 208 for each matching advertisement. The timing penalty may be determined by reading a timing penalty for the current time interval, $\beta(i,k)$, from a record associated with a matching advertisement. In some implementations, the timing penalty is determined based on analysis of past impression allocation data. For example, the timing penalties may be determined in accordance with one of the algorithms of Appendix A. In some implementations, the timing penalties may have been determined using process 300 of FIG. 3.

In some implementations, the timing penalty is determined based in part upon the impression weights for impressions that were previously allocated to the matching advertisement during the delivery period. For example, the timing penalty may be determined by the allocation subsystem 120.

In some implementations, the timing penalty depends in part on a delivery metric, $\partial(S(i,k))$, for the matching advertisement during the current interval of the delivery period, where $S(i,k)$ is a set of weights for impressions allocated to the content item i in the current interval, k. For example, the delivery metric may be an average or a minimum of the weights of previous impressions allocated to the matching advertisement during the interval. In some implementations the delivery metric is an exponentially weighted sum of the weights for previous impressions.

In some implementations, the delivery metric may not use all of the weights or impression scores for every impression allocated to the matching advertisement during the current interval. The delivery metric may depend on the weights for a subset of the past impressions that have the highest weight values. For example, the delivery metric may be determined by the allocation subsystem 120.

A score is determined 210 for each of the matching advertisements. The score may be an allocation score. The score may be determined based on the weight and the timing penalty for the matching advertisement. For example, the score may be calculated by subtracting the timing penalty from the weight. For example, the score may be determined by the allocation subsystem 120.

An advertisement is selected 212 to be allocated the impression in response to the request. In some implementations, the selected advertisement is a matching advertisement having a highest score. In some implementations, the selected advertisement can be matching advertisement having a score that exceeds a threshold (e.g. zero). For example, the threshold may operate as a condition that a matching advertisement must meet in order for the advertisement to be selected for presentation. When a threshold is used as a condition for selecting advertisements and more than one matching advertisement has a score that exceeds the threshold, the matching advertisement with the highest score may be selected. In some implementations, if no matching advertisements have a score that exceeds the threshold, then a non-click-tracked advertisement may be allocated the impression. A non-click-tracked advertisement is an advertisement for which there is no available weight or impression score. If there no matching advertisements that exceed the threshold and no non-click-tracked advertisement available, a back-up advertisement may be selected and allocated the impression requested. For example, the selection of an advertisement may be performed by the allocation subsystem 120.

In some implementations, the advertisement is selected 212 by randomly drawing an advertisement from a distribution, where each advertisement has a probability of being selected proportional to its score. For example, when considering 3 eligible advertisements (ad A, ad B, and ad C) for an impression, where ad A has a score of 1.5, ad B has a score of 0.5, and ad C has a score of −0.5, a probability distribution may be derived from the scores and used to randomly select one of the three advertisements. For example, all eligible advertisements with scores below a threshold (e.g., zero) may be assigned a probability of zero, while all advertisements with scores above the threshold may be assigned a score proportional to score for that advertisement. In this example, ad C is assigned a selection probability of zero, while ad A may be assigned a probability of 0.75 and ad B may be assigned a probability of 0.25. So in this case ad A may be selected 75% of the time and ad B may be selected 25% of the time.

Figure 3:
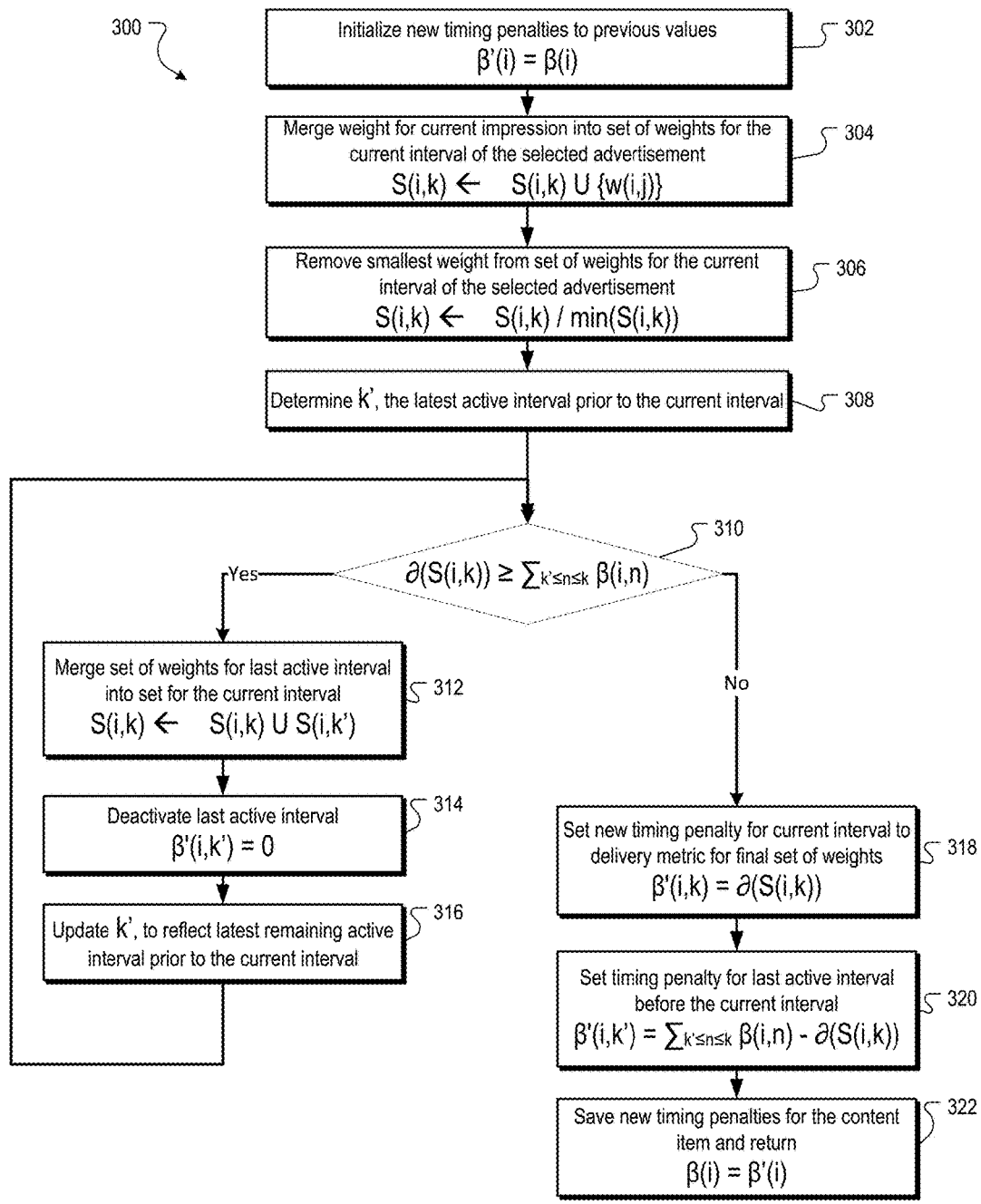
FIG. 3 is a flow chart of an example process for determining timing penalties for content items.

The timing penalties for the selected advertisement may be updated 214. For example, the timing penalties may be updated in accordance with one of the algorithms descried in Appendix A. In some implementations, the process 300 depicted in FIG. 3 is performed to update the timing penalties for the selected advertisement. The updated timing penalties may be stored in a record associated with the selected advertisement for later use the next time the advertisement is considered as an eligible advertisement for allocation of a future impression.

The selected advertisement may be allocated 216 in response to the request. In some implementations, the selected advertisement can be provided to a user device that requested the publisher resource with which the advertisement is being provided. The advertisement can be provided to the user device, for example, over a content delivery network. The advertisement can be provided with presentation instructions that specify a content slot in which the advertisement is to be presented. In turn, the advertisement can be presented on a user device according to the presentation instructions. The advertisement may be allocated by transmitting data reflecting the advertisement. For example, the advertisement may be allocated 216 by transmission through a server system interface of the allocation subsystem 120 or the advertising management system 110.

The process 200 can be iteratively performed for a single publisher resource and multiple instances of the process 200 can be performed in parallel by one or more data processing apparatus. For example, the process 200 can be performed in parallel for two or more different resource requests that are received requesting allocations of resources and content items.

FIG. 3 is a flow chart of an example process 300 for determining timing penalties for a content item. The process 300 determines timing penalties for intervals forming a partition of a delivery period for a content item (e.g. an advertisement) that has just been selected for allocation of a new impression. Each interval may be assigned a delivery goal, N(i,n), that is less than or equal to the delivery goal for the content item over the entire delivery period, N(i), where n is an arbitrary index for the time intervals. For example, the delivery goal for a day may be partitioned into 24 prefix intervals, each an hour longer than the last. Each interval may be associated with a set of previous impression weights, S(i,n). When the delivery period starts, the sets of weights for each interval may have been initialized to include N(i,n)−N(i,n−1) zeros and the timing penalties for the intervals may have been initialized to zero, corresponding to an inactive interval. The current interval, k, is the earliest ending interval that includes the current time. In some implementations, an interval becomes active when it is first allocated an impression as the current interval. Additional weights may be associated with current interval through allocations or mergers of weights associated with previous prefix intervals. When an earlier prefix interval becomes irrelevant to the allocation of future impressions, it may be deactivated by setting its timing penalty to back to zero. The timing penalty for the current interval, β(i,k), may be determined based on a delivery metric, ∂(S(i,k)), for the weights associated with the current interval. The current timing penalty, β(i,k), may be used to make allocation decisions for future impressions while enforcing soft timing constraints on the delivery of the content item i.

The process 300 can be implemented, for example, by the allocation subsystem 120 and/or the advertisement management system 110 of FIG. 1. In some implementations, the allocation subsystem 120 is a data processing apparatus that includes one or more processors that are configured to perform actions of the process 200. For example, the data processing apparatus may be the apparatus described in FIG. 4. In other implementations, a computer readable medium can include instructions that when executed by a computing device (e.g., a computer system) cause the device to perform actions of the process 300.

The set of timing penalties for the content item, β(i), may be updated upon the allocation of a new impression to the content item or the occurrence of some other event. In some implementations, β(i) may be updated only when need using stored impression data from a data store.

The determination of new β(i) may start by saving the previous values while initializing 302 the new values, β'(i), to the previous values. The weight for the new impression, w(i,j), may be merged 304 into the set of weights associated with the current interval, S(i,k). The smallest weight may be removed 306 from S(i,k).

The timing penalties may then be checked to determine if weight sets for previous intervals should be merged with the set for the current interval. The latest active interval prior to the current interval, k', may be determined 308 by checking the β(i) for non-zero values going backwards from interval k. The delivery metric, ∂(S(i,k)), for the current interval is determined and compared 310 to the sum of the old timing penalties from k' through the current interval k. If the delivery metric, is greater than the sum of these old timing penalties, the set of weights associated with the k' interval, S(i,k'), are merged 312 into the set of weights associated with the current interval, S(i,k). At this point, the earlier k' interval may be deactivated 314 by setting its timing penalty to zero, i.e. β'(i,k')=0. A new k' may then be determined 316 by checking the β(i) for non-zero values going backwards from interval k'. If there is an earlier active interval, i.e. k'>0, then the sum of old timing penalties to which the delivery metric is compared to test for merger conditions will increase. In some implementations, the comparison 310 may be additionally conditioned on k' being positive, i.e. (∂(S(i, k))≥$\Sigma_{k' \leq n \leq k}$β(i,n)) && k'>0.

If the delivery metric, ∂(S(i,k)), is greater than the sum of old timing penalties for intervals between k' and k, no further interval mergers are performed. The new timing penalty for the current interval is set 318 based on the delivery metric for the set of weights associated with the current interval, e.g. β'(i,k)=∂(S(i,k)). The new timing penalty for the latest remaining active interval may also be set 320 to offset the change in the timing penalty for the current interval, e.g. β'(i,k)=$\Sigma_{k' \leq n \leq k}$β(i,n)−∂(S(i,k)). The new timing penalties may be saved 322 for later use. For example, the new timing penalties may be saved in a data storage device in a record associated with the content item i. The timing penalties may be accessed later to determine the timing penalty applicable when the content item is considered as an eligible content item for a future impression allocation.

The process 300 of FIG. 3 may be adapted to address other online allocation problems including the AdWords allocation problems well as some types of display and mobile content item allocation problems. For example, advertisers may declare a budget constraint for an advertisement over a delivery period, and also a bid for each type of impression, and upon assigning an impression to an advertisement, the advertiser pays his/her bid for this purpose. The goal in this setting may be to allocate impressions to advertisers such that throughout the day, the budget specified by each advertiser is spent smoothly while the total revenue extracted from advertisers is maximized. The delivery period may be partitioned into intervals with a corresponding set of nested budget constraints (similar to the nested capacity constraints for the display ad problem). Using a process similar to process 300, impression allocations may be determined that are approximately optimal for this problem. Timing penalties may be determined to enforce soft timing constraints on spending from a budget for a content item. When the technique is adapted for this type of budget constraint problem, the discounting based on interval budget constraints may appear as a multiplicative timing penalty as opposed to having an additive timing penalty. An example algorithm for addressing the AdWords problem is described in Appendix A.

FIG. 4 is block diagram of an example computer system 400 that can be used to facilitate display of content items. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

The web server, advertisement server, and content aggregator can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The web server and advertisement server can be distributively implemented over a network, such as a server farm, or can be implemented in a single computer device.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

For situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (for example, to a city, zip code, or state level), so that a particular location of the user cannot be determined.

The processes described herein and variations thereof contain functionality to ensure that party privacy is protected. Likewise, the processes may be programmed to confirm that information about a party is publicly known before divulging that information to another party even before incorporating that information into a social graph.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method performed by a data processing apparatus, the method comprising:
   receiving, at a given time, a request for transmission of content, including characteristics of an impression corresponding to the request;
   identifying, by one or more processing devices from a first data source over a distributed network, a set of matching content items that are eligible to be served in response to the request;
   receiving, from a second data source over the distributed network, weight data indicating weights of previous impressions to which the matching content items have been allocated during a current interval of a delivery period, the current interval comprising the given time at which the request for transmission of the content is received;
   for each matching content item, associating, in one or more data records, that matching content item of the set with timing constraint data that constrains transmission of that matching content item, the timing constraint data determined from the weight data received from the second data source over the distributed network;
   controlling transmission of the set of matching content items to one or more remote computing systems over the distributed network by performing operations comprising:
     for a matching content item in the set:
       determining, by the one or more processing devices based on the weight data, a weight associated with a pairing of the matching content item and the impression, the weight further based in part on the characteristics of the impression;
       determining, by the one or more processing devices, a timing penalty for the matching content item for the current interval of the delivery period, the delivery period having a delivery goal of a number of impressions to be allocated to the matching content item during the delivery period, the delivery period being divided into a plurality of intervals to smooth allocations of impressions in the delivery goal to the matching content item over the delivery period, each interval having a timing constraint in accordance with timing constraint data associated, in the one or more data records, with that matching content item, with the timing constraint specifying an amount of impressions from the delivery goal allocated to the matching content item during that interval of the delivery period, the timing penalty based in part on weights of previous impressions the matching content item has been allocated during the current interval of the delivery period; and
       automatically enforcing the timing constraint for the current interval of the delivery period by automatically updating, by the one or more processing devices, a score for the matching content item, based in part on the weight and the timing penalty of the current interval;
     for the current interval of the delivery period and in response to the request, selecting one of the matching content items, based in part on updated scores for the matching content items; and allocating the impression to the selected one of the matching content items, including causing presentation of the selected one of the matching content items in response to the request.

2. The method of claim 1, wherein the timing penalty is determined in part by determining an average of the weights of the previous impressions.

3. The method of claim 1, wherein the timing penalty is determined in part by determining a minimum of the weights of the previous impressions.

4. The method of claim 1, wherein the timing penalty is determined in part by determining an exponentially weighted sum of the weights of the previous impressions.

5. The method of claim 1, wherein the timing penalty depends on a subset of the previous impressions.

6. The method of claim 1, wherein determining the timing penalty comprises merging a subset of the previous impressions associated with a previous interval into a subset of previous impressions associated with the current interval.

7. The method of claim 1, wherein at least one of the characteristics of the impression on which the weights are based is a characteristic of a user who requested the impression.

8. The method of claim 1, wherein at least one of the characteristics of the impression on which the weights are based is a time associated with the request.

9. The method of claim 1, wherein the weight for one of the matching content items is a predicted click through rate for that matching content item in the impression.

10. The method of claim 1, wherein the score for the matching content item is determined in part by subtracting the timing penalty for the current interval from the weight.

11. The method of claim 1, wherein the plurality of intervals each has a maximum number of impressions requested.

12. The method of claim 1, wherein the plurality of intervals each has a budget for impressions.

13. A system, comprising:

a server system interface configured to receive, at a given time, a request for transmission of content including characteristics of an impression corresponding to the request;

a module configured to identify receive from a first data source over a distributed network a set of matching content items that are eligible to be served in response to the request;

a module configured to receive, from a second data source over the distributed network, weight data indicating weights of previous impressions to which the matching content items have been allocated during a current interval of a delivery period, the current interval comprising the given time at which the request for transmission of the content is received;

a module configured to, for each matching content item, associating, in one or more data records, that matching content item of the set with timing constraint data that constrains transmission of the matching content item, with timing constraint data determined from the weight data received from the second data source over the distributed network;

controlling transmission of the set of matching content items to one or more remote computing systems over the distributed network by performing operations comprising:

for a matching content item:

a module configured to determine based on the weight data, a weight associated with a pairing of the matching content item and the impression, the weight further based in part on characteristics of the impression;

a module for determining a timing penalty for the matching content item for the current interval of the delivery period, the delivery period having a delivery goal of a number of impressions to be allocated to the matching content item during the delivery period, the delivery period being divided into a plurality of intervals to smooth allocations of impressions in the delivery goal to the matching content item over the delivery period, each interval having a timing constraint in accordance with timing constraint data associated, in the one or more data records, with that matching content item, with the timing constraint specifying an amount of impressions from the delivery goal allocated to the matching content item during that interval of the delivery period, the timing penalty based in part on weights of previous impressions the matching content item has been allocated during the current interval of the delivery period;

a module for automatically enforcing the timing constraint for the current interval of the delivery period by automatically updating, by the one or more processing devices, a score for the matching content item, based in part on the weight and the timing penalty of the current interval;

a module configured to select, for the current interval of the delivery period and in response to the request, one of the matching content items, based in part on updated scores for the matching content items; and a server system interface configured to allocate, for the current interval of the delivery period, the impression to the selected one of the matching content items, and cause presentation of the selected one of the matching content items in response to the request.

14. The system of claim 13, wherein the timing penalty is determined in part by determining an average of the weights of the previous impressions.

15. The system of claim 13, wherein the timing penalty is determined in part by determining a minimum of the weights of the previous impressions.

16. The system of claim 13, wherein the timing penalty is determined in part by determining an exponentially weighted sum of the weights of the previous impressions.

17. The system of claim 13, wherein determining the timing penalty comprises merging a subset of the previous impressions associated with a previous interval into a subset of previous impressions associated with the current interval.

18. The system of claim 13, wherein the plurality of intervals each has a maximum number of impressions requested.

19. The system of claim 13, wherein the plurality of intervals each has a budget for impressions.

20. One or more non-transitory computer readable media storing instructions that are executable by one or more processing devices to perform operations comprising:

receiving, at a given time, a request for transmission of content, including characteristics of an impression corresponding to the request;

identifying from a first data source over a distributed network, a set of matching content items that are eligible to be served in response to the request;

receiving, from a second data source over the distributed network, weight data indicating weights of previous impressions to which the matching content items have been allocated during a current interval of a delivery period, the current interval comprising the given time at which the request for transmission of the content is received;

for each matching content item, associating, in one or more data records, that matching content item of the set with timing constraint data that constrains transmission of that matching content item, the timing constraint data determined from the weight data received from the second data source over the distributed network;

controlling transmission of the set of matching content items to one or more remote computing systems over the distributed network by performing operations comprising:

for a matching content item in the set:
determining based on the weight data, a weight associated with a pairing of the matching content item and the impression, the weight further based in part on the characteristics of the impression;

determining a timing penalty for the matching content item for the current interval of the delivery period, the delivery period having a delivery goal of a number of impressions to be allocated to the matching content item during the delivery period, the delivery period being divided into a plurality of intervals to smooth allocations of impressions in the delivery goal to the matching content item over the delivery period, each interval having a timing constraint in accordance with timing constraint data associated, in the one or more data records, with that matching content item, with the timing constraint specifying an amount of impressions from the delivery goal allocated to the matching content item during that interval of the delivery period, the timing penalty based in part on weights of previous impressions the matching content item has been allocated during the current interval of the delivery period; and automatically enforcing the timing constraint for the current interval of the delivery period by automatically updating a score for the matching content item, based in part on the weight and the timing penalty of the current interval;

for the current interval of the delivery period and in response to the request, selecting one of the matching content items, based in part on updated scores for the matching content items; and allocating the impression to the selected one of the matching content items, including causing presentation of the selected one of the matching content items in response to the request.

21. A system, comprising:
a data processing apparatus; and
a memory coupled to the data processing apparatus having instructions stored thereon which, when executed by the data processing apparatus cause the data processing apparatus to perform operations comprising:
receiving, at a given time, a request for transmission of content, including characteristics of an impression corresponding to the request;

identifying, from a first data source over a distributed network, a set of matching content items that are eligible to be served in response to the request;

receiving, from a second data source over the distributed network, weight data indicating weights of previous impressions to which the matching content items have been allocated during a current interval of a delivery period, the current interval comprising the given time at which the request for transmission of the content is received;

for each matching content item, associating, in one or more data records, that matching content item of the set with timing constraint data that constrains transmission of that matching content item, the timing constraint data determined from the weight data received from the second data source over the distributed network;

controlling transmission of the set of matching content items to one or more remote computing systems over the distributed network by performing operations comprising:

for a matching content item in the set:
determining based on the weight data, a weight associated with a pairing of the matching content item and the impression, the weight further based in part on the characteristics of the impression;

determining a timing penalty for the matching content item for the current interval of the delivery period, the delivery period having a delivery goal of a number of impressions to be allocated to the matching content item during the delivery period, the delivery period being divided into a plurality of intervals to smooth allocations of impressions in the delivery goal to the matching content item over the delivery period, each interval having a timing constraint in accordance with timing constraint data associated, in the one or more data records, with that matching content item, with the timing constraint specifying an amount of impressions from the delivery goal allocated to the matching content item during that interval of the delivery period, the timing penalty based in part on weights of previous impressions the matching content item has been allocated during the current interval of the delivery period; and automatically enforcing the timing constraint for the current interval of the delivery period by automatically updating a score for the matching content item, based in part on the weight and the timing penalty of the current interval;

for the current interval of the delivery period and in response to the request, selecting one of the matching content items, based in part on updated scores for the matching content items; and allocating the impression to the selected one of the matching content items, including causing presentation of the selected one of the matching content items in response to the request.

22. The system of claim 21, wherein the timing penalty is determined in part by determining an average of the weights of the previous impressions.

23. The system of claim 21, wherein the timing penalty is determined in part by determining a minimum of the weights of the previous impressions.

24. The system of claim 21, wherein the timing penalty is determined in part by determining an exponentially weighted sum of the weights of the previous impressions.

25. The system of claim 21, wherein determining the timing penalty comprises merging a subset of the previous impressions associated with a previous interval into a subset of previous impressions associated with the current interval.

26. The system of claim 21, wherein the plurality of intervals each has a maximum number of impressions requested.

27. The system of claim 21, wherein the plurality of intervals each has a budget for impressions.

* * * * *